US 12,282,608 B2

(12) United States Patent
Park et al.

(10) Patent No.: US 12,282,608 B2
(45) Date of Patent: Apr. 22, 2025

(54) USER INTERFACE, CONTROL METHOD THEREOF, AND VEHICLE HAVING USER INTERFACE

(71) Applicants: HYUNDAI MOTOR COMPANY, Seoul (KR); KIA CORPORATION, Seoul (KR)

(72) Inventors: Danghee Park, Seoul (KR); Sukmin Choi, Hwaseong-si (KR); Sunwook Kim, Asan-si (KR); Juhee Park, Seongnam-si (KR); Jangryul Rim, Suwon-si (KR); Sehyun Chang, Suwon-si (KR); Hongmin Kim, Cheonan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/238,761

(22) Filed: Aug. 28, 2023

(65) Prior Publication Data
US 2024/0220024 A1   Jul. 4, 2024

(30) Foreign Application Priority Data
Dec. 30, 2022   (KR) .......................... 10-2022-0190228

(51) Int. Cl.
*G09G 3/00* (2006.01)
*G06F 3/01* (2006.01)
(Continued)

(52) U.S. Cl.
CPC .............. *G06F 3/017* (2013.01); *G06F 3/011* (2013.01); *G06T 7/246* (2017.01); *G06T 7/73* (2017.01); *G06V 10/44* (2022.01); *G06V 20/593* (2022.01); *G06V 40/28* (2022.01); *G09G 3/002* (2013.01); *G06T 2207/30196* (2013.01); *G06T 2207/30268* (2013.01); *G09G 2354/00* (2013.01); *G09G 2380/10* (2013.01)

(58) Field of Classification Search
CPC .......... G06F 3/017; G06F 3/011; G06T 7/246; G06T 7/73; G06T 2207/30196; G06T 2207/30268; G06V 10/44; G06V 20/593; G06V 40/28; G09G 3/002; G09G 2354/00; G09G 2380/10
See application file for complete search history.

(56) References Cited

U.S. PATENT DOCUMENTS 9,195,794 B2 * 11/2015 Dariush ................. G06F 30/15
9,858,702 B2 *  1/2018 Wild ....................... G06T 11/60
(Continued)

FOREIGN PATENT DOCUMENTS

| KR | 10-2015-0014139 A | 2/2015 |
| KR | 10-1842600 B1 | 5/2018 |
| KR | 10-2020-0016126 A | 2/2020 |

*Primary Examiner* — Amy Onyekaba
(74) *Attorney, Agent, or Firm* — Morgan, Lewis & Bockius LLP

(57) ABSTRACT

A control method of a user interface may include: detecting an occupant from an image input from a camera; estimating a skeleton of the occupant; estimating a relative position of a finger of the occupant based on the estimated skeleton; determining a projection position based on the relative position of the finger, and projecting a projection image on the projection position by an image projector and playing the projection image.

19 Claims, 7 Drawing Sheets

(51) Int. Cl.
*G06T 7/246* (2017.01)
*G06T 7/73* (2017.01)
*G06V 10/44* (2022.01)
*G06V 20/59* (2022.01)
*G06V 40/20* (2022.01)

(56) References Cited

U.S. PATENT DOCUMENTS

| | | | | |
|---|---|---|---|---|
| 9,868,449 | B1* | 1/2018 | Holz | B60W 50/10 |
| 9,902,266 | B2* | 2/2018 | Pisz | B60K 35/10 |
| 10,025,388 | B2* | 7/2018 | Tang | B60K 35/10 |
| 10,216,892 | B2* | 2/2019 | John | G06F 30/20 |
| 10,545,663 | B2* | 1/2020 | Yoon | G06F 40/106 |
| 10,562,394 | B2* | 2/2020 | Ling | B60K 35/00 |
| 10,838,206 | B2 | 11/2020 | Fortin-Deschenes et al. | |
| 10,860,872 | B2* | 12/2020 | Wang | H04N 23/90 |
| 10,871,856 | B2 | 12/2020 | Lee et al. | |
| 2009/0278915 | A1* | 11/2009 | Kramer | B60K 35/10 |
| | | | | 345/158 |
| 2011/0115892 | A1* | 5/2011 | Fan | G06V 40/20 |
| | | | | 348/E7.087 |
| 2011/0242102 | A1 | 10/2011 | Hess | |
| 2012/0274549 | A1 | 11/2012 | Wehling et al. | |
| 2014/0022171 | A1* | 1/2014 | Yanai | G06F 3/017 |
| | | | | 345/158 |
| 2014/0321750 | A1 | 10/2014 | Nouri et al. | |
| 2015/0177842 | A1* | 6/2015 | Rudenko | G06F 3/017 |
| | | | | 345/156 |
| 2016/0004907 | A1* | 1/2016 | Lundberg | H04N 13/395 |
| | | | | 348/53 |
| 2016/0004908 | A1* | 1/2016 | Lundberg | G06F 3/011 |
| | | | | 382/103 |
| 2019/0095733 | A1* | 3/2019 | Wang | H04N 7/181 |
| 2019/0180473 | A1* | 6/2019 | Guleryuz | G06V 40/10 |
| 2020/0104629 | A1* | 4/2020 | Hiroki | G06F 18/2431 |
| 2021/0022811 | A1* | 1/2021 | Mahfouz | A61F 2/4603 |
| 2021/0150754 | A1* | 5/2021 | Tanaka | G06V 40/103 |
| 2021/0342610 | A1* | 11/2021 | Kim | G06V 20/59 |
| 2022/0129686 | A1* | 4/2022 | Lee | B60W 40/08 |
| 2022/0256123 | A1* | 8/2022 | Parenti | B60H 1/00871 |
| 2022/0319199 | A1* | 10/2022 | Abe | B60R 21/015 |
| 2023/0027320 | A1* | 1/2023 | Pathak | A61B 5/1124 |
| 2023/0061557 | A1* | 3/2023 | Agura | G06F 3/04812 |
| 2023/0123623 | A1* | 4/2023 | Kawase | G06V 40/11 |
| | | | | 382/103 |
| 2023/0356682 | A1* | 11/2023 | Kurapati | B60R 21/01552 |
| 2023/0408841 | A1* | 12/2023 | Seder | G02B 27/10 |
| 2024/0065781 | A1* | 2/2024 | Gao | G06T 7/0012 |
| 2024/0104919 | A1* | 3/2024 | Machino | H04N 1/00331 |

\* cited by examiner

USER INTERFACE, CONTROL METHOD THEREOF, AND VEHICLE HAVING USER INTERFACE

CROSS-REFERENCE TO RELATED APPLICATION

The present application claims priority to Korean Patent Application No. 10-2022-0190228, filed on Dec. 30, 2022, the entire contents of which is incorporated herein for all purposes by this reference.

BACKGROUND OF THE PRESENT DISCLOSURE

Field of the Present Disclosure

The present disclosure relates to a user interface, a control method thereof, and a vehicle including the user interface.

Description of Related Art

In addition to a driving function, vehicles include additional functions for user convenience such as an audio function, video function, navigation function, air-conditioning control, seat control, lighting control, and the like.

Such vehicles include a user interface for inputting operation commands of various functions and outputting operation states of the various functions. The user interface enables interactions between a user and a variety of electronic devices provided in a vehicle.

Existing user interfaces restrict or specify an interior of vehicle for hardware configuration, reducing user convenience.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a user interface, a control method thereof, and a vehicle including the user interface which may display a projection image for vehicle operation in a space near an occupant.

Various aspects of the present disclosure are directed to providing a user interface, a control method thereof, and a vehicle including the user interface which may display a projection image for vehicle operation in a space near an occupant, and then recognize a hand gesture of the occupant in the projection image.

Additional aspects of the present disclosure will be set forth in part in the description which follows, and in part, will be obvious from the description, or may be learned by practice of the present disclosure.

According to an aspect of the present disclosure, a control method of a user interface includes: detecting an occupant from an image input from a camera; estimating a skeleton of the occupant; estimating a relative position of a finger of the occupant based on the estimated skeleton; determining a projection position based on the relative position of the finger; and projecting a projection image on the projection position by an image projector and playing the projection image.

The estimating of the skeleton includes determining whether a motion of the occupant is an image play motion for playing the projection image, and upon concluding that the motion of the occupant is the image play motion, estimating the skeleton of the occupant.

The estimating of the skeleton includes extracting joint feature points corresponding to joints of the occupant from the image, and estimating the skeleton of the occupant based on a relationship among the joint feature points.

The estimating of the relative position of the finger includes determining a reference plane of the occupant based on a reference point of the occupant, determining a coordinate system of the occupant based on the reference plane, and estimating the relative position of the finger of the occupant based on the coordinate system.

The determining of the reference plane of the occupant includes determining an intersection of a spine line and a shoulder line of the occupant's skeleton as the reference point of the occupant, and determining a skeleton plane including the reference point, the spine line and the shoulder line as the reference plane.

The estimating of the relative position of the finger includes estimating a position of a hand extremity of the occupant relative to the reference point as the relative position of the finger, based on the spine line being a first axis, the shoulder line being a second axis, and a forward direction of the occupant being a third axis in the coordinate system.

The determining of the projection position includes determining a position spaced from the reference point by a third axis distance of the relative position of the finger in a third axial direction as the projection position.

The playing of the projection image includes generating a projection plane parallel to the reference plane centered on an image reference point where the reference point is projected on the projection position, and projecting the projection image on the projection plane.

The control method further includes, while playing the projection image, in response to a motion of the occupant being an image movement motion for moving the projection image, projecting the projection image on another projection position and playing the projection image.

The control method further includes, while playing the projection image, in response to a motion of the occupant being a command input motion for inputting an application command, determining an application command selected by the occupant from at least one application command in the projection image, and transmitting the selected application command to an electronic device so that the electronic device executes the selected application command.

The determining of the selected application command includes determining the relative position of the occupant's finger, and comparing the relative position of the occupant's finger with a position of at least one application command area in the projection plane on which the projection image is projected, to determine the application command selected by the occupant.

According to an aspect of the present disclosure, a user interface includes: a camera configured to obtain an image inside a vehicle; an image projector configured to project the image in a space; and a controller operatively connected to the image projector and configured to control the image projector. The controller is configured to: detect an occupant from an image input from the camera, estimate a skeleton of the occupant, estimate a relative position of a finger of the occupant based on the estimated skeleton, determine a projection position based on the relative position of the finger, and project a projection image on the projection position by the image projector to play the projection image.

The controller is configured to determine whether a motion of the occupant is an image play motion for playing the projection image, and upon concluding that the motion of the occupant is the image play motion, estimate the skeleton of the occupant.

The controller is configured to extract joint feature points corresponding to joints of the occupant from the image, and estimate the skeleton of the occupant based on a relationship among the joint feature points.

The controller is configured to determine a reference plane of the occupant based on a reference point of the occupant, determine a coordinate system of the occupant based on the reference plane, and estimate the relative position of the finger of the occupant based on the coordinate system.

The controller is configured to determine an intersection of a spine line and a shoulder line of the occupant's skeleton as the reference point of the occupant, and determine a skeleton plane including the reference point, the spine line and the shoulder line as the reference plane.

The controller is configured for estimating a position of a hand extremity of the occupant relative to the reference point as the relative position of the finger, based on the spine line being a first axis, the shoulder line being a second axis, and a forward direction of the shoulder line being a third axis in the coordinate system.

The controller is configured to determine a position spaced from the reference point by a third axis distance of the relative position of the finger in a third axial direction as the projection position.

The controller is configured to generate a projection plane parallel to the reference plane centered on an image reference point where the reference point is projected on the projection position, and project the projection image on the projection plane.

According to an aspect of the present disclosure, a vehicle includes: a camera configured to obtain an image inside a vehicle; an image projector configured to project the image in a space; and a controller operatively connected to the image projector and configured to control the image projector. The controller is configured to: detect an occupant from the image input from the camera, estimate a skeleton of the occupant, estimate a relative position of a finger of the occupant based on the estimated skeleton, determine a projection position based on the relative position of the finger, and project a projection image on the projection position by the image projector to play the projection image.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
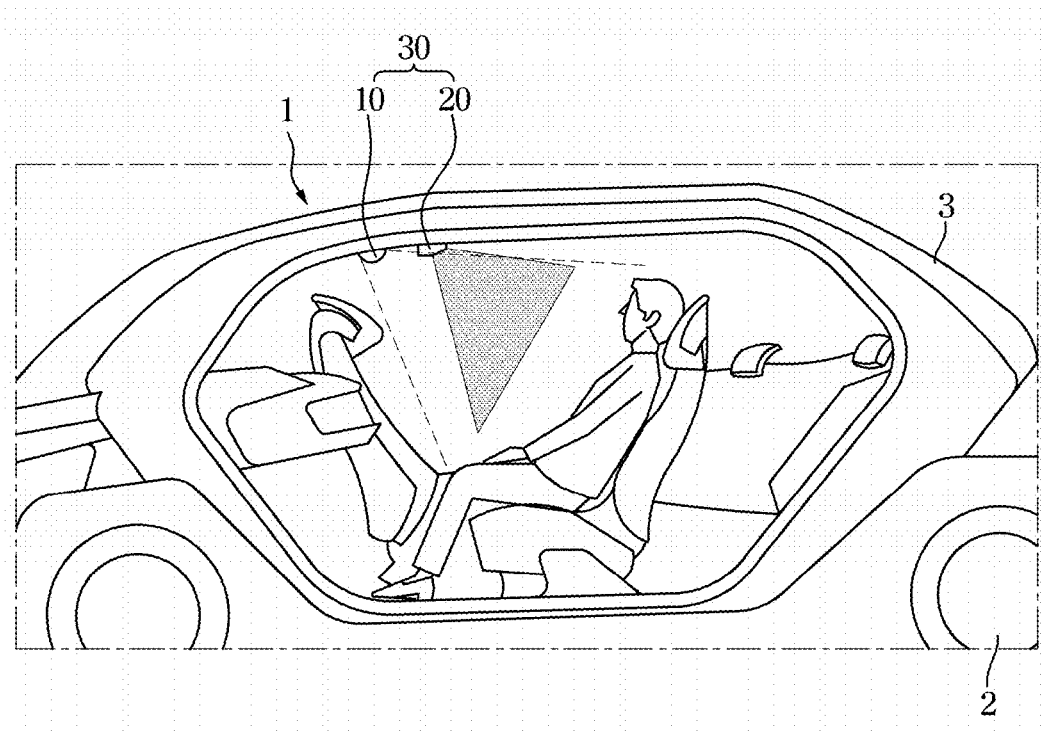
FIG. 1 is a diagram illustrating a configuration of a vehicle provided with a user interface according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like reference numerals throughout the specification denote like elements. Also, the present specification does not describe all the elements according to various exemplary embodiments of the present disclosure, and descriptions well-known in the art to which the present disclosure pertains or overlapped portions are omitted. The terms such as "~part", "~module", and the like may refer to at least one process processed by at least one hardware or software. According to various exemplary embodiments of the present disclosure, a plurality of "~parts", "~modules" may be embodied as a single element, or a single of a "~part", "~module" may include a plurality of elements.

It should be understood that when an element is referred to as being "connected" to another element, it may be directly or indirectly connected to the other element, wherein the indirect connection includes "connection" via a wireless communication network.

It should be understood that the term "include" when used in the present specification, specifies the presence of stated features, integers, steps, operations, elements, and/or components, but does not preclude the presence or addition of at least one other features, integers, steps, operations, elements, components, and/or groups thereof.

It should be understood that when it is stated in the present specification that a member is located "on" another member, not only a member may be in contact with another member, but also yet another member may be present between the two members.

It should be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 is a diagram illustrating a configuration of a vehicle provided with a user interface according to an exemplary embodiment of the present disclosure.

Referring to FIG. 1, an interior of a vehicle 1 is briefly illustrated.

The vehicle 1 may include wheels 2 for moving the vehicle and a vehicle body 3 defining an exterior of the vehicle. The vehicle body 3 may also are configured to accommodate users (occupants).

The vehicle 1 may be an autonomous vehicle configured for autonomously driving to a destination without a driver's specific operation. Accordingly, the vehicle 1 may not necessarily include a driver's seat arranged for an occupant to look forward thereof. Seats inside the vehicle 1 may be arranged to allow occupants to have different viewing directions.

A user interface 30 including a camera 10 and an image projector 20 may be provided inside the vehicle 1.

The user interface 30 may include the camera 10 provided inside the vehicle 1 to capture the occupants sitting in the vehicle 1 and the image projector 20 provided to project an image on interior of the vehicle 1.

Figure 2:
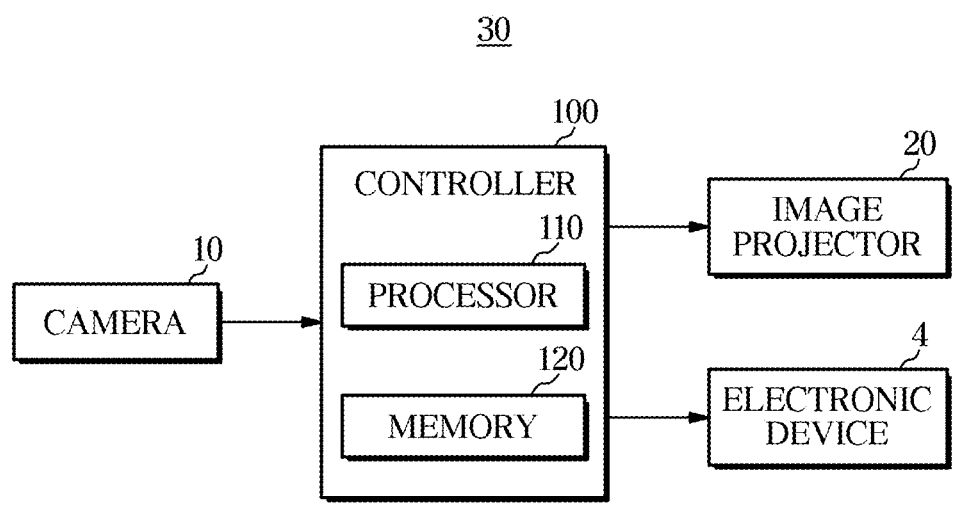
FIG. 2 is a control block diagram of a user interface according to an exemplary embodiment of the present disclosure.

FIG. 2 is a control block diagram illustrating a user interface according to an exemplary embodiment of the present disclosure.

Referring to FIG. 2, the user interface 30 may include the camera 10 obtaining an image of interior of the vehicle, the image projector 20 projecting the image in a space, and a controller 100 controlling the camera 10 and the image projector 20 connected to the controller 100.

The camera 10 may obtain image data of the interior of the vehicle 1. For example, the camera 10 may be mounted near a ceiling of the vehicle 1 and be a camera with a field of view facing the interior of the vehicle 1.

The image data may include information of an occupant in the vehicle 10.

The camera 10 may include a plurality of lenses and image sensors. The image sensor may include a plurality of photodiodes converting light into an electrical signal, and the plurality of photodiodes may be arranged in a two-dimensional (2D) matrix.

The camera 10 may be an in-cabin camera mounted inside the vehicle 1 for confirming a state of the occupant in real time.

The image projector 20 may project a projection image on an internal space of the vehicle 1. The projection image may be displayed in the space so that the occupant can visually recognize the projection image. For example, the image projector 20 may be mounted near to the ceiling of the vehicle 1 and project the projection image in a space in front of the occupant.

The projection image may include information of 2D or 3D text or pictures corresponding to commands for controlling various electronic devices provided in the vehicle 1.

The image projector 20 may include a holographic device displaying a 3D hologram as a projection image or an image device displaying a light emitting diode (LED) image. The image projector 20 may also include a transparent display device movable as required.

The controller 100 may include at least one processor 110 and memory 120.

The memory 120 may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a Hard Disk Drive (HDD), or a compact disc read only memory (CD-ROM), without being limited thereto.

The memory 120 and the processor 110 may be integrated into one chip, or provided as separate chips.

The controller 100 may detect an occupant from an image input from the camera 10, estimate a skeleton of the occupant, estimate a relative position of a finger of the occupant based on the estimated skeleton, and control the image projector 20 to project a projection image on a projection position determined based on the relative position of the finger.

While playing the projection image, the controller 100 may recognize a hand gesture of the occupant in the projection image, determine an application command selected by the occupant from application commands in the projection image, and transmit the application command to an electronic device 4. The controller 100 may receive a selection on an application command that the occupant desires to execute based on a distance and a position of the occupant's finger from the projection image.

The controller 100 may be configured for controlling the electronic device 4 according to the application command selected by the occupant. The controller 100 may transmit the application command selected by the occupant to the electronic device 4. Accordingly, the electronic device 4 may execute a function corresponding to the selected application command.

The electronic device 4 may include an audio device, video device, navigation device, air-conditioning device, seat device, lighting device, advanced driver assist system (ADAS), and the like. For example, the ADAS may include functions such as an adaptive cruise control (ACC), an intelligent speed limit assist (ISLA), a forward collision avoidance (FCA), an autonomous emergency braking (AEB), a lane departure warning (LDW), a lane keeping assist (LKA), a lane following assist (LFA), a high beam assist (HBA), a traffic sign recognition (TSR), a blind spot detection (BSD), a smart cruise control (SCC), a tire pressure monitoring system (TPMS), and the like.

At least one application for controlling the various functions of electronic device is provided in the electronic device 4.

The controller 100 may transmit the application command to the electronic device 4, controlling the electronic device according to the application command.

Level 4 autonomous driving does not require human intervention to the vehicle, because driving is controlled under specified conditions. In Level 4 autonomous driving, a driver will disappear, and an occupant will be able to ride in the vehicle in various ways.

In such a driving environment, an occupant may require use of various vehicle controls to change an internal environment and for convenience. That is, existing physical operation and control devices will be eliminated, and a separate control system will be required.

According to an exemplary embodiment of the present disclosure, a projection image including text, pictures, etc., for execution of various applications of the vehicle may be played by projecting the projection image in a 3D space, and an application command desired by an occupant may be recognized based on recognition of a hand gesture of the occupant in the projection image, improving a convenience of operation of the occupant without space constraints in operation and function execution of autonomous vehicle.

Figure 3:
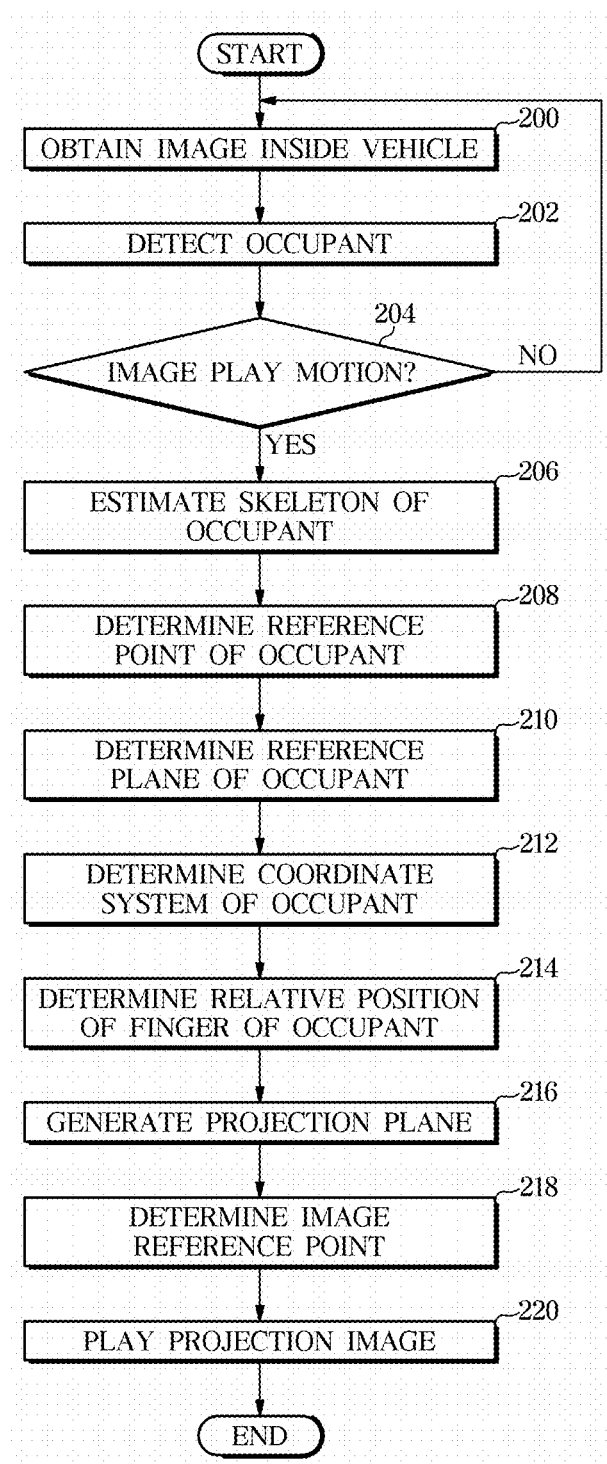
FIG. 3 is a flowchart illustrating a control method of a user interface according to an exemplary embodiment of the present disclosure.

FIG. 3 is a flowchart illustrating a control method of a user interface according to an exemplary embodiment of the present disclosure.

Referring to FIG. 3, the user interface 30 may obtain an image inside a vehicle through the camera 10 (200).

The camera 10 may be configured to generate image data by capturing interior of the vehicle 1. The camera 10 may be provided in a location to take photos of all seats inside the vehicle.

The controller 100 may receive the image data from the camera 10.

The user interface 30 may detect an occupant from the image obtained by the camera 10 (202).

The controller 100 may detect the occupant in the image obtained by the camera 10.

The controller 100 may identify a presence or absence of the occupant and a position of the occupant in the image input from the camera 10 using object detection technologies. For example, deep learning based-object detection models may be largely divided into a 2-stage detector and a 1-stage detector. The 2-stage detector includes a region proposal for proposing a region where an object exists and a classification for performing classification based on a convolutional neural network. Region-based convolutional neural network (R-CNN) and Faster R-CNN are typical of convolutional neural network. The Faster R-CNN proposes a region proposal network (RPN) which generates region proposals with neural networks rather than existing algorithms.

The controller 100 may detect the occupant based on any one of R-CNN, Faster R-CNN, RetinaNet, or RetinaFace, without being limited thereto.

The controller 100 may extract features from the image of interior of the vehicle through the convolution neural network, and classify classes of the extracted features, detecting the presence or absence of the occupant and the position of the occupant.

The user interface 30 may be configured to determine whether a motion of the occupant is an image play motion for playing the projection image (204). For example, the image play motion may be a gesture of opening an occupant's palm.

The controller 100 may recognize the occupant's motion, and determine whether the occupant's motion is the image play motion for playing the projection image.

When the occupant's motion matches the image play motion for playing the projection image, the controller 100 may be configured to determine the occupant's motion as the image play motion.

When the occupant's motion is the image play motion (Yes in operation 204), the user interface 30 may estimate a skeleton of the occupant.

The controller 100 may estimate a real-time skeleton of the occupant using a skeleton extraction algorithm (206).

The controller 100 may extract points of occupant's joints and body parts by applying the skeleton extraction algorithm to the occupant image, estimating the real-time skeleton of the occupant. That is, by mapping the skeleton to the occupant image, the real-time skeleton of the occupant may be estimated.

Figure 4:
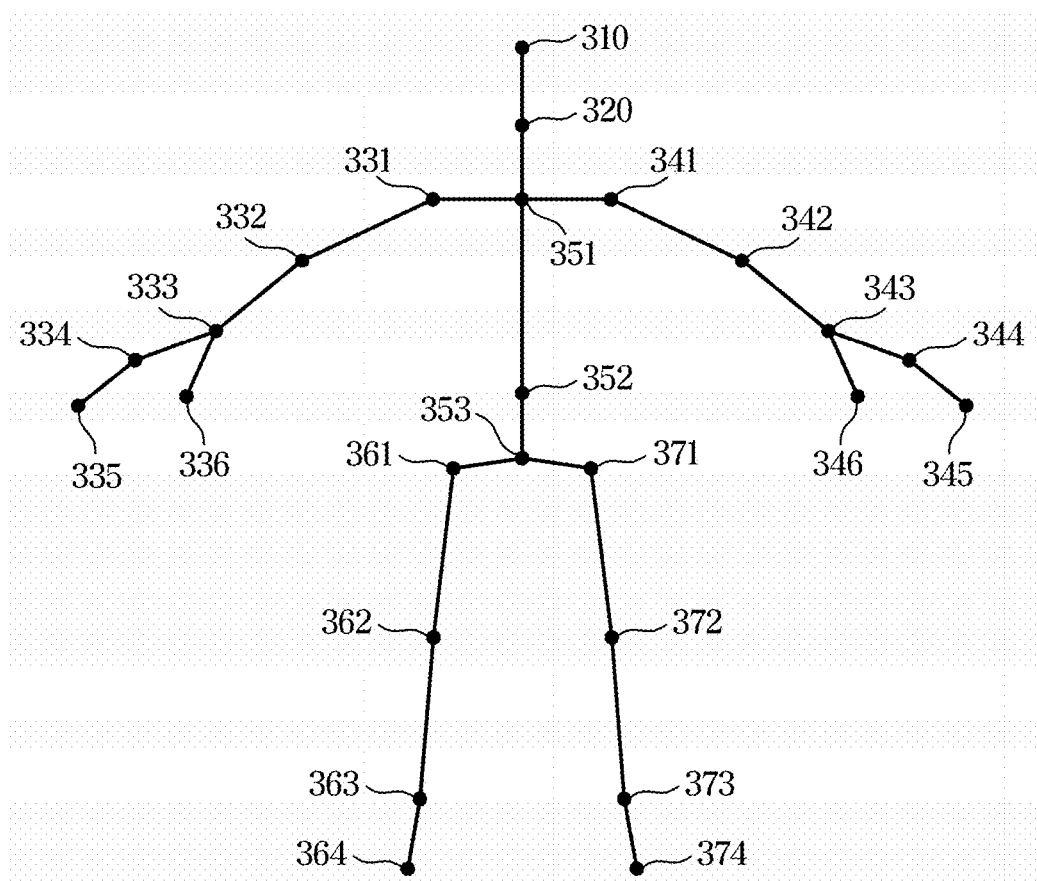
FIG. 4 is a diagram illustrating extraction of joint data of an occupant in a user interface according to an exemplary embodiment of the present disclosure.

FIG. 4 is a diagram illustrating extraction of joint data of an occupant in a user interface according to an exemplary embodiment of the present disclosure.

Referring to FIG. 4, the controller 100 may extract joint movement data of an occupant through image processing of an occupant image. Accordingly, 3D joint coordinates of real-time skeleton of the occupant may be estimated.

The controller 100 may extract joint feature points corresponding to joints of the occupant from the occupant image, and extract the joint movement data of the occupant by determining the change amount in joint position and the change amount in joint angle of the occupant based on a relationship among the joint feature points.

The controller 100 sets the joint feature points on extremities and jointed limbs of a human body. For example, the joint feature points may be set on a head 310, neck 320, right shoulder joint 331, right elbow joint 332, right wrist joint 333, right hand joint 334, right finger extremity 335, right thumb joint 336, left shoulder joint 341, left elbow joint 342, left wrist joint 343, left hand joint 344, left finger extremity 345, left thumb joint 346, spine joint around shoulder 351, spine joint 352, spine joint around pelvic 353, right pelvic joint 361, right knee joint 362, right ankle joint 363, right foot extremity 364, left pelvic joint 371, left knee joint 372, left ankle joint 373, and left foot extremity 374. The above positions set as the joint feature points may be set variously using an inverse kinematics algorithm, and the like, without being limited to specific embodiments.

Furthermore, the occupant image obtained by the camera 10 may include only a portion of the occupant and not the entire body of the occupant. For example, the occupant image may include only an occupant's upper body.

Meanwhile, although only the right finger extremity 335, right thumb joint 336, left finger extremity 345, and left thumb joint 346 are described for convenience of description, hand joint features are not limited thereto. Each endpoint (extremity) of five fingers of the right and left hand may be extracted.

The controller 100 may use machine learning or deep learning methods, when estimating the real-time skeleton of the occupant.

Referring again to FIG. 3, the user interface 30 may be configured to determine a reference point of the occupant based on the skeleton of the occupant (208), determine a reference plane of the occupant based on the reference point of the occupant (210), determine a coordinate system of the occupant based on the reference plane (212), determine a relative position of the finger of the occupant (214), generate a projection plane based on the relative position of the finger of the occupant (216), determine an image reference point based on the projection plane and the reference point of the occupant (218), and play the projection image on the projection plane based on the image reference point (220).

Figure 5:
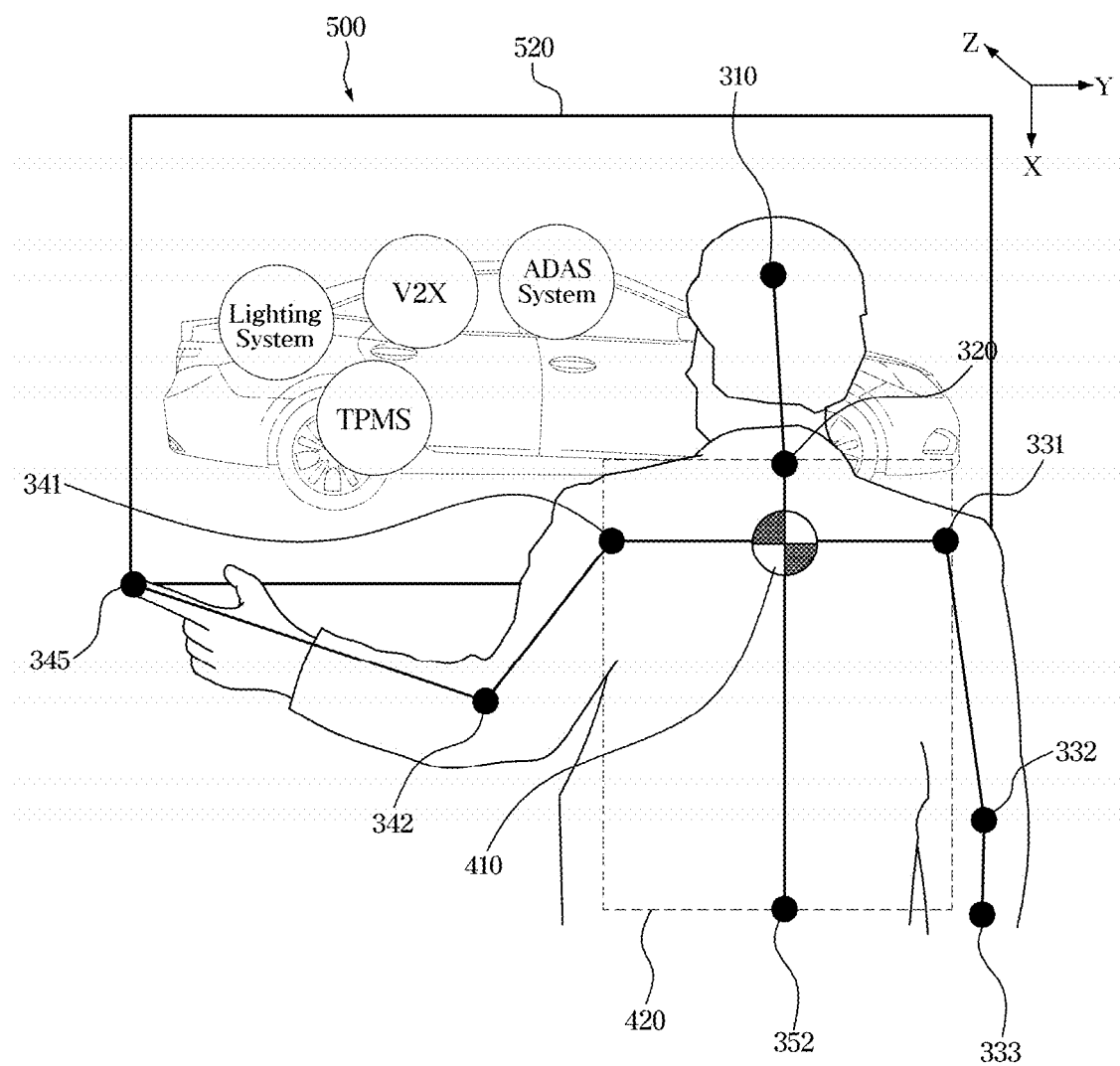
FIG. 5 and FIG. 6 illustrate projecting a projection image in a space near fingers of an occupant using a skeleton of the occupant in a user interface according to an exemplary embodiment of the present disclosure.
Figure 6:
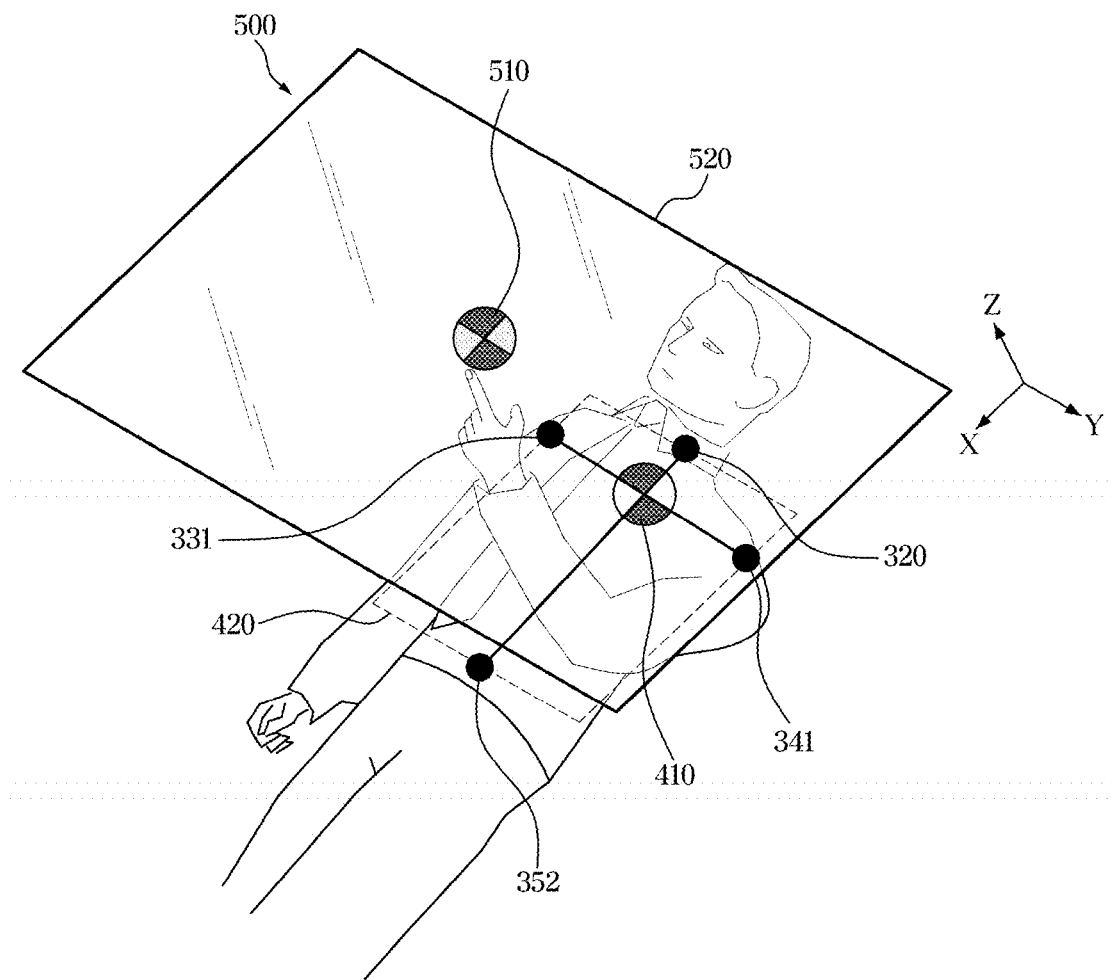

FIG. 5 and FIG. 6 illustrate projecting a projection image in a space near fingers of an occupant using a skeleton of the occupant in a user interface according to an exemplary embodiment of the present disclosure.

Referring to FIG. 5 and FIG. 6, a real-time reference point 410 and real-time coordinate system of an occupant may be derived based on a real-time skeleton of the occupant, determining a relative position of a finger of the occupant.

A projection plane 520 on which a projection image is projected may be generated from the relative position of the occupant's finger, and the projection image 500 may be projected on the projection plane 520 based on an image reference point 510 on the projection plane, playing the projection image 500 in a space near to the relative position of the occupant's finger.

After estimating the real-time skeleton of the occupant by applying a skeleton extraction algorithm to the occupant image, the real-time reference point 410 of the occupant may be extracted based on the real-time skeleton of the occupant.

A real-time position and posture of occupant may be identified through the occupant's real-time skeleton extracted from the occupant image.

An intersection of a spine line and a shoulder line of an initial skeleton of the occupant mapped to the occupant image may be set as a reference point of the occupant, and a plane including the two lines may be set as a reference plane of the occupant.

The intersection of the spine line, formed by the occupant's neck 320 and spine joint 352, and the shoulder line formed by the occupant's right shoulder joint 331 and left shoulder joint 341 may be set as the occupant's reference point 410.

A skeleton plane including the occupant's reference point 410 and formed by the occupant's spine line and shoulder line may be set as an occupant's reference plane 420.

For example, when the spine line and the shoulder line are set as an x-axis (first axis) and a y-axis (second axis), respectively, a forward direction of the occupant becomes a z-axis as a third axis. The XYZ axes may establish a real-time coordinate system of the occupant. That is, the real-time coordinate system of the occupant may be a coordinate system where an XY plane is a reference and a direction in which the finger is positioned is the z-axis.

From the occupant's real-time coordinate system, a relative position of occupant's outstretched finger in a forward direction (z-axis) may be obtained. The relative position of the occupant's finger may be a position of occupant's fingertip, which may be a position of the left finger extremity 345 of the skeleton in FIG. 5 and FIG. 6.

When coordinates of the reference point is (0, 0, 0) in the real-time coordinate system, the relative position of the occupant's finger may be a fingertip position spaced from the reference point (0, 0, 0).

A projection position on which the projection image 500 is played may be a position spaced from the occupant's reference point 410 by a z-axis distance of the finger's relative position in the z-axis direction thereof.

The projection image 500 is projected on the projection plane 520 generated at the projection position.

The projection plane 520 may be generated by moving the occupant's reference plane 420 in parallel by the position of the finger. The projection plane 520 may be generated by moving the reference plane 420 in parallel by the z-axis distance between the finger extremity 345 and the reference plane 420 in the z-axial direction of the real-time coordinate system.

The projection plane 520 may be centered on the image reference point 510.

The image reference point 510 may be a point where the occupant's reference point 410 is projected on the projection plane 520. Based on the image reference point 510, a projection plane initially generated at the projection position is moved in the z-axis and y-axis to align the image reference point 510 to be centered.

By projecting the projection image 500 on the projection plane 520, the projection image 500 may be played in a space near to the relative position of the occupant's finger.

Furthermore, when the projection position where the projection image 500 is played is required to be changed, the projection position of the projection image 500 may be moved to a different projection position by performing an image movement motion for moving the projection image 500 by the occupant, and then changing an occupant's finger position. For example, the image movement motion may be a gesture of waving a palm.

Meanwhile, when the occupant desires to end the projection image 500 being played, playback of the projection image 500 may be finished by performing a playback end motion (e.g., a playback end gesture) for finishing the playback of the projection image 500. For example, the playback end motion may be a first clenching gesture.

In the projection image 500, application commands for controlling the electronic device 4 of the vehicle 1 may be displayed. The application commands may be displayed as icons such as text, pictures, or the like. The application commands may be displayed in various forms.

Figure 7:
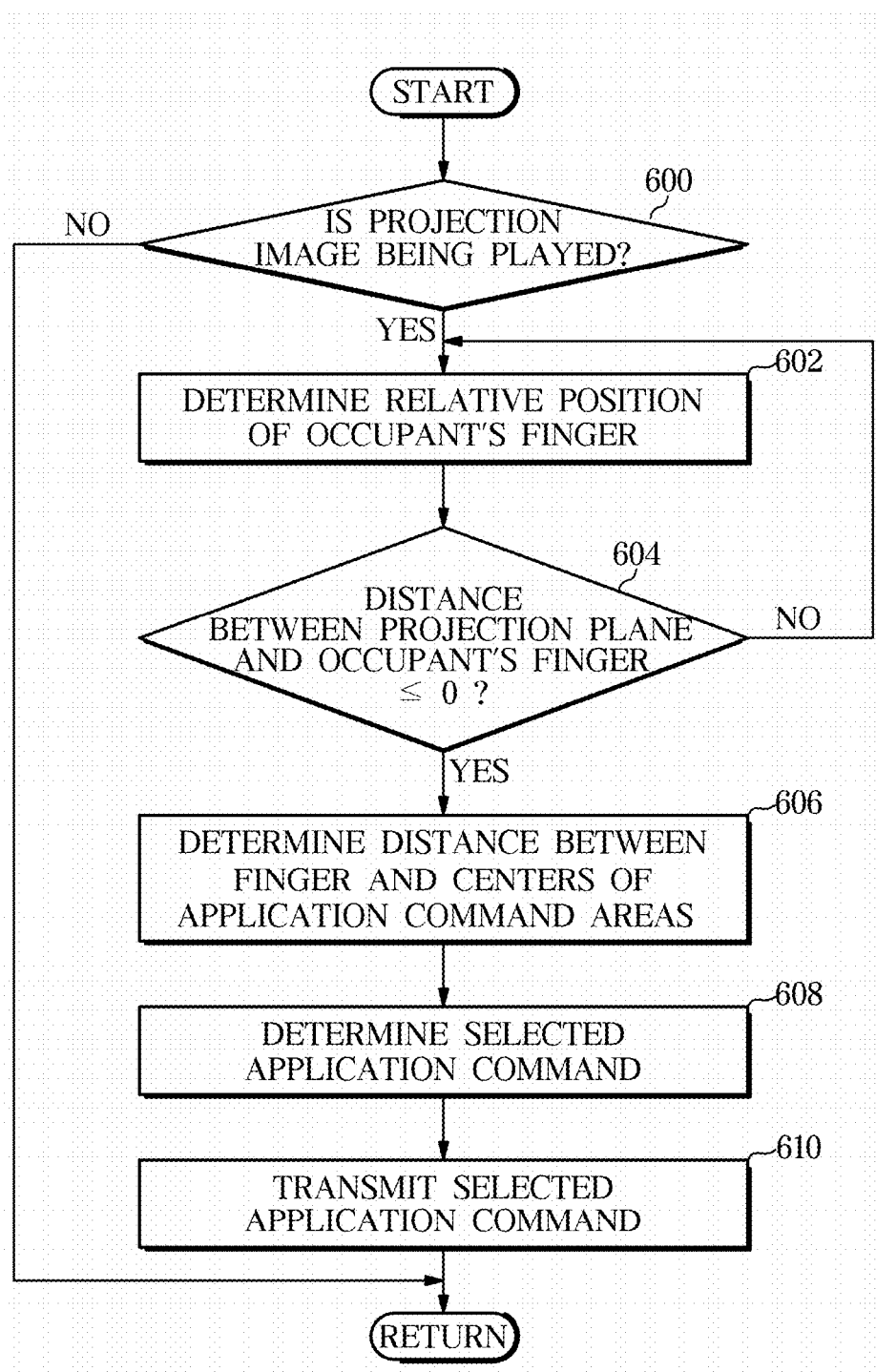
FIG. 7 is a flowchart illustrating interactions between an occupant and a projection image being played in a user interface according to an exemplary embodiment of the present disclosure.

FIG. 7 is a flowchart illustrating interactions between an occupant and a projection image being played in a user interface according to an exemplary embodiment of the present disclosure.

Referring to FIG. 7, the user interface 30 may be configured to determine whether the projection image 500 is being played in a space (600).

When the projection image 500 is being played (Yes in operation 600), the user interface 30 may be configured to determine a relative position of a finger of an occupant (602). In the present instance, when the projection image 500 is being played, the user interface 30 may be configured to determine whether a motion of the occupant is a command input motion for inputting an application command, and when the occupant's motion is the command input motion, the user interface 30 may be configured to determine a relative position of the occupant's finger. The command input motion may be a motion for the occupant to input a desired application command by selecting at least one of application commands displayed in the projection image 500.

The user interface 30 may be configured to determine whether a distance between the projection plane 520 and the occupant's finger is 0 (604).

When the distance between the projection plane 520 and the occupant's finger is greater than 0 (No in operation 604), the user interface 30 may return to operation 602, and perform following operations.

Meanwhile, when the distance between the projection plane 520 and the occupant's finger is equal to or less than 0 (Yes in operation 604), the user interface 30 may be configured to determine a distance between the occupant's finger and centers of application command areas in the projection image 500 (606).

The user interface 30 may be configured to determine the application command selected by the occupant, based on the distance between the occupant's finger and the centers of application command areas in the projection image 500 (608). That is, the application command selected by the occupant may be determined by comparing the relative position of the occupant's finger with a position of the application command area in the projection plane 520 on which the projection image 500 is projected.

The user interface 30 may determine, as the application command selected by the occupant, an application command in an area including a center portion with a shortest distance to the occupant's finger among the application commands.

The user interface 30 may transmit the application command selected by the occupant to the electronic device 4 so that the electronic device 4 may perform a function corresponding to the application command selected by the occupant (610). Meanwhile, the user interface 30 may also directly control the electronic device 4 in accordance with the application command selected by the occupant.

Figure 8:
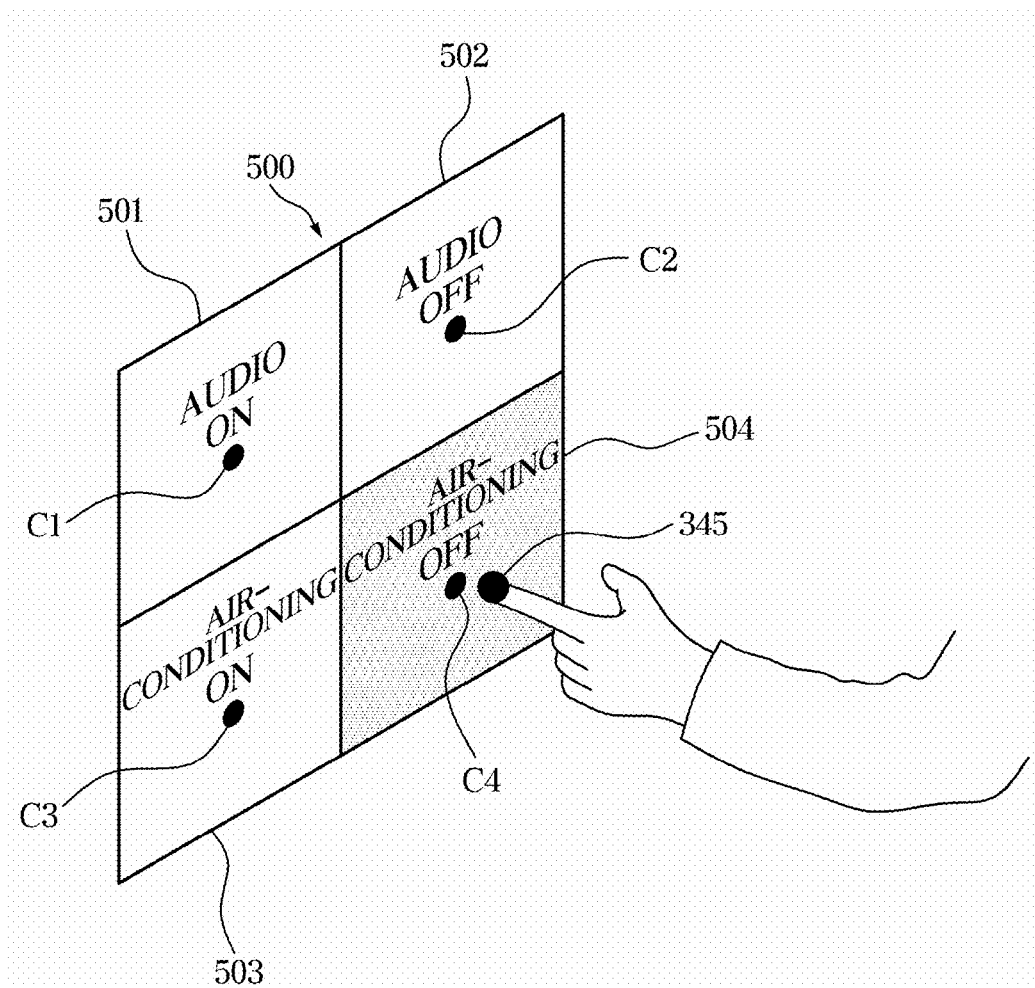
FIG. 8 illustrates determining a command selected by a position of occupant's finger in a user interface according to an exemplary embodiment of the present disclosure.

FIG. 8 illustrate determining a command selected by a position of occupant's fingers in a user interface according to an exemplary embodiment of the present disclosure.

Referring to FIG. 8, the user interface 30 and an occupant may be interacted with each other through the projection image 500 played in a 3D space.

To select an application command by touching a screen of the projection image 500 with a finger, a distance between the screen including a plurality of application commands and a position of the finger may be determined.

When the finger touches the screen or passes through the projection plane 520, a point where a distance between the position of the finger and the projection plane is temporarily equal to or less than 0 may exist. Among the plurality of application commands on the screen, an application command closest to the finger at the point may be determined as the application command selected by the occupant. Accordingly, by mapping the projection image 500 and the position of the occupant's finger, the application command that the occupant desires to execute may be recognized.

In the projection image 500, an application command area may be divided into four command areas 501, 502, 503, and 504.

The first command area 501 may be a command area for receiving an 'audio ON' command for turning on an audio device.

The second command area 502 may be a command area for receiving an 'audio OFF' command for turning off the audio device.

The third command area 503 may be a command area for receiving 'air conditioning ON' command for turning on an air conditioner.

The fourth command area 504 may be a command area for receiving 'air conditioning OFF' command for turning off the air conditioner.

It is illustrated in FIG. 8 that an occupant selects the fourth command area 504 with the occupant's finger.

By determining a distance between occupant's left finger extremity 345 and a center portion of each command area C1, C2, C3, and C4, a command area with a shortest distance from the left finger extremity 345 may be determined to be the fourth command area 504.

Accordingly, it may be determined that the occupant has selected the fourth command area 504, and the 'air conditioning OFF' command, which is an application command of the fourth command area 504, is transmitted to the air conditioner, turning off the air conditioner.

As described above, according to an exemplary embodiment of the present disclosure, a projection image including text, pictures, and the like, for execution of various applications of vehicle may be projected and played in a 3D space, and an application command that an occupant desires to execute may be recognized by recognizing an occupant's hand gesture in the projection image. Accordingly, occupant's convenience may be improved without space constraints in operation and function execution of autonomous vehicle.

Furthermore, control systems requiring physical configuration may be eliminated, maximizing cabin space utilization for occupants in Level 4 autonomous driving. Furthermore, occupants with hearing impairments and limited mobility may use a mobility or system through motion recognition, and a physical control system including an audio, video, and navigation (AVN) device, control buttons, and electric and wiring components may be removed, reducing manufacturing cost.

As is apparent from the above, according to the exemplary embodiments of the present disclosure, a projection image for vehicle operation may be displayed in a space near an occupant, improving occupant's convenience.

Also, a projection image for vehicle operation may be displayed in a space near an occupant, and a hand gesture of the occupant in the projection image may be recognized, improving occupant's convenience.

Meanwhile, the aforementioned controller and/or its constituent components may include at least one processor/microprocessor(s) combined with a non-transitory computer-readable recording medium storing a computer-readable code/algorithm/software. The processor/microprocessor(s) may execute the computer-readable code/algorithm/software stored in the computer-readable recording medium to perform the above-descried functions, operations, steps, and the like.

The aforementioned controller and/or its constituent components may further include a memory implemented as a non-transitory computer-readable recording medium or transitory computer-readable recording medium. The memory may be controlled by the aforementioned controller and/or its constituent components and configured to store data, transmitted to or received from the aforementioned controller and/or its constituent components, or data processed or to be processed by the aforementioned controller and/or its constituent components.

The included embodiment may be implemented as the computer-readable code/algorithm/software in the computer-readable recording medium. The computer-readable recording medium may be a non-transitory computer-readable recording medium such as a data storage device configured for storing data readable by the processor/microprocessor(s). For example, the computer-readable recording medium may be a Hard Disk Drive (HDD), a solid state drive (SSD), a silicon disk drive (SDD), a read only memory (ROM), a compact disc read only memory (CD-ROM), a magnetic tape, a floppy disk, an optical recording medium, and the like.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless particularly stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a user interface, the method comprising:
   detecting, by a controller, an occupant from an image input from a camera;
   estimating, by the controller, a skeleton of the occupant;
   estimating, by the controller, a relative position of a finger of the occupant based on the estimated skeleton;
   determining, by the controller, a projection position based on the relative position of the finger;
   projecting, by the controller, a projection image on the projection position via an image projector operatively connected to the controller, and playing the projection image; and,
   comparing the relative position of the occupant's finger with a position of at least one application command area in a projection plane on which the projection image is projected, to determine an application command selected by the occupant,
   wherein the projection image is projected to float inside a vehicle.

2. The method of claim 1, wherein the estimating of the skeleton includes:
   determining whether a motion of the occupant is an image play motion for playing the projection image, and upon concluding that the motion of the occupant is the image play motion, estimating the skeleton of the occupant.

3. The method of claim 1, wherein the estimating of the skeleton includes:
   extracting joint feature points corresponding to joints of the occupant from the image; and
   estimating the skeleton of the occupant based on a relationship among the joint feature points.

4. The method of claim 1, wherein the estimating of the relative position of the finger includes:
   determining a reference plane of the occupant based on a reference point of the occupant;
   determining a coordinate system of the occupant based on the reference plane; and
   estimating the relative position of the finger of the occupant based on the coordinate system.

5. The method of claim 4, wherein the determining of the reference plane of the occupant includes:
   determining an intersection of a spine line and a shoulder line of the occupant's skeleton as the reference point of the occupant; and
   determining a skeleton plane including the reference point, the spine line and the shoulder line as the reference plane.

6. The method of claim 5, wherein the estimating of the relative position of the finger includes:
   estimating a position of a hand extremity of the occupant relative to the reference point as the relative position of the finger, based on the spine line being a first axis, the shoulder line being a second axis, and a forward direction of the occupant being a third axis in the coordinate system.

7. The method of claim 4, wherein the determining of the projection position includes:
   determining a position spaced from the reference point by a third axis distance of the relative position of the finger in a third axial direction as the projection position.

8. The method of claim 7, wherein the playing of the projection image includes:
   generating the projection plane parallel to the reference plane centered on an image reference point where the reference point is projected on the projection position, and
   projecting the projection image on the projection plane.

9. The method of claim 1, further including:
   while playing the projection image, in response to a motion of the occupant being an image movement motion for moving the projection image, projecting the projection image on another projection position and playing the projection image.

10. The method of claim 1, further including:
    while playing the projection image, in response to a motion of the occupant being a command input motion for inputting the application command,
    transmitting the selected application command to an electronic device so that the electronic device executes the selected application command.

11. A user interface, comprising:
    a camera configured to obtain an image inside a vehicle;
    an image projector configured to project the image in a space; and
    a controller operatively connected to the image projector and configured to control the image projector,
    wherein the controller is configured to:
       detect an occupant from an image input from the camera;
       estimate a skeleton of the occupant;
       estimate a relative position of a finger of the occupant based on the estimated skeleton;

determine a projection position based on the relative position of the finger;

project a projection image on the projection position by the image projector to play the projection image; and compare the relative position of the occupant's finger with a position of at least one application command area in a projection plane on which the projection image is projected, to determine an application command selected by the occupant, wherein the projection image is projected to float inside the vehicle.

12. The user interface of claim 11, wherein the controller is further configured to determine whether a motion of the occupant is an image play motion for playing the projection image, and upon concluding that the motion of the occupant is the image play motion, estimate the skeleton of the occupant.

13. The user interface of claim 11, wherein the controller is further configured to extract joint feature points corresponding to joints of the occupant from the image, and estimate the skeleton of the occupant based on a relationship among the joint feature points.

14. The user interface of claim 11, wherein the controller is further configured to determine a reference plane of the occupant based on a reference point of the occupant, determine a coordinate system of the occupant based on the reference plane, and estimate the relative position of the finger of the occupant based on the coordinate system.

15. The user interface of claim 14, wherein the controller is further configured to determine an intersection of a spine line and a shoulder line of the occupant's skeleton as the reference point of the occupant, and determine a skeleton plane including the reference point, the spine line and the shoulder line as the reference plane.

16. The user interface of claim 15, wherein the controller is further configured for estimating a position of a hand extremity of the occupant relative to the reference point as the relative position of the finger, based on the spine line being a first axis, the shoulder line being a second axis, and a forward direction of the occupant being a third axis in the coordinate system.

17. The user interface of claim 14, wherein the controller is further configured to determine a position spaced from the reference point by a third axis distance of the relative position of the finger in a third axial direction as the projection position.

18. The user interface of claim 17, wherein the controller is further configured to generate the projection plane parallel to the reference plane centered on an image reference point where the reference point is projected on the projection position, and project the projection image on the projection plane.

19. A vehicle, comprising:
a camera configured to obtain an image inside a vehicle;
an image projector configured to project the image in a space; and
a controller operatively connected to the image projector and configured to control the image projector,
wherein the controller is configured to:
detect an occupant from the image input from the camera;
estimate a skeleton of the occupant;
estimate a relative position of a finger of the occupant based on the estimated skeleton;
determine a projection position based on the relative position of the finger;
project a projection image on the projection position by the image projector to play the projection image; and
compare the relative position of the occupant's finger with a position of at least one application command area in a projection plane on which the projection image is projected, to determine an application command selected by the occupant,
wherein the projection image is projected to float inside the vehicle.

* * * * *